Oct. 29, 1946.     R. F. FARRIS ET AL     2,410,278
WATER LOCATING SYSTEM
Filed Oct. 30, 1941     2 Sheets-Sheet 2

Inventors:
Riley Floyd Farris
Joseph B. Clark
By Paul F. Hawley
Patent Agent

UNITED STATES PATENT OFFICE 2,410,278

WATER LOCATING SYSTEM

Riley Floyd Farris and Joseph B. Clark, Tulsa, Okla., assignors to Stanolind Oil and Gas Company, Tulsa, Okla., a corporation of Delaware Application October 30, 1941, Serial No. 417,184

19 Claims. (Cl. 175—182)

This invention pertains to the art of determining the position in a well of zones of ingress of undesired electrically conducting liquids thereinto and, more specifically, pertains to the location of water flows into oil or gas wells.

In the oil production industry it has always been recognized that the problem of the location of flows of brine into wells is complex. This is due in considerable part to the fact that many wells produce oil and water from several permeable strata. When production is from a single formation, water nearly always enters at the bottom of that formation. In such cases sealing off of the bottom of the well often eliminates the inflow of connate water. However, there has always been great difficulty in locating accurately the exact plug-back depth to use. Often, wells were not plugged back far enough up the hole, with the result that water continued to flow into the hole. On the other hand, some wells may have been plugged back too far obstructing the flow of oil from a portion of the sand which was not water-bearing, and reducing the productivity of the well. Thus the accurate location of the oil-water interface in a single formation has been very difficult and the location of the various oil-water interfaces in a multiple formation well has been practically impossible.

Formation resistivity well logs have been employed to locate the water-producing sand in a producing section, but such methods have been found to yield in general very unsatisfactory results. This is partly due to the inherent difficulty in obtaining a precise interpretation of well logs, but more frequently to the fact that the accuracy of the location of the water source is low, since it depends upon the rapidity with which the survey is made after water flows in the well, since the water produced in the well migrates either upwardly or downwardly as the well log is being made. In general no precise determination can be effected.

We have found that it is possible to overcome the difficulties inherent in the prior systems of well logging used to locate the source of water ingress. This method is electrical in its nature and depends upon the well known fact that the water found in such wells is of very high conductivity and hence differs widely from the relatively low conductivity oil. It is therefore an object of this invention to provide an improved means of determining the location of a zone of inflow of conducting liquids into a well producing also relatively non-conducting liquids.

Prior art methods of determining the presence of water in an oil well have in practice frequently failed due to the fact that the water which enters the well is usually immediately divided into fine droplets dispersed in the oil. These droplets do not touch each other and therefore unless the electrodes employed were spaced extremely closely together the change in conductivity of the fluid could not be detected. On the other hand, if the electrodes were placed so closely together that the average drop of water would short-circuit them, the resistance to flow of the well fluids through the passage defined by the closely spaced electrodes was so great that the water tended to bypass around the electrodes and prevent an adequate measurement from being taken. Moreover, clearly erroneous measurements could be made in that one or two water droplets might pass between the electrodes at a location quite removed from the water source, while the main flow of water bypassed the electrodes. In such a case, the position of the water could be determined to be a place quite removed from the actual water sand. Therefore it is a further object of our invention to provide an electrical water locating system for use in oil wells in which the electrodes are spaced sufficiently widely so that a single drop of water cannot short circuit them but in which a predetermined amount of water must be collected as the well is produced before there is any indication, after which there is a positive non-varying indication clearly showing the location of the source of this water.

Another object of this invention is to provide a system of the type described in which conductivity measurements are made at a number of spaced points which are maintained stationary in the well during the period of investigation, and which affect a single resultant reading from which the location of one or more water sands can be expeditiously determined.

A further object of this invention is to provide such a system for locating the presence of producing water sands in an oil well in which a large portion of the water produced into the well after the preliminary conditioning of said well will be entrapped in one or another of numerous conductivity determining stations spaced through the producing formation, whereby a positive determination of the major water flow is simplified.

It is an object of this invention to provide such a system in which the water determining means are provided with purging means whereby any contaminating extraneous water which may have entered the water determining means during its passage from the surface to the location in the well can be eliminated, thus insuring that the location of the water strata in the well will not be affected by extraneous conditions. Further objects and advantages of this invention will become apparent from a reading of the appended specification and of the associated drawings which form a part thereof and are to be read in connection therewith. In these drawings:

Figure 1:
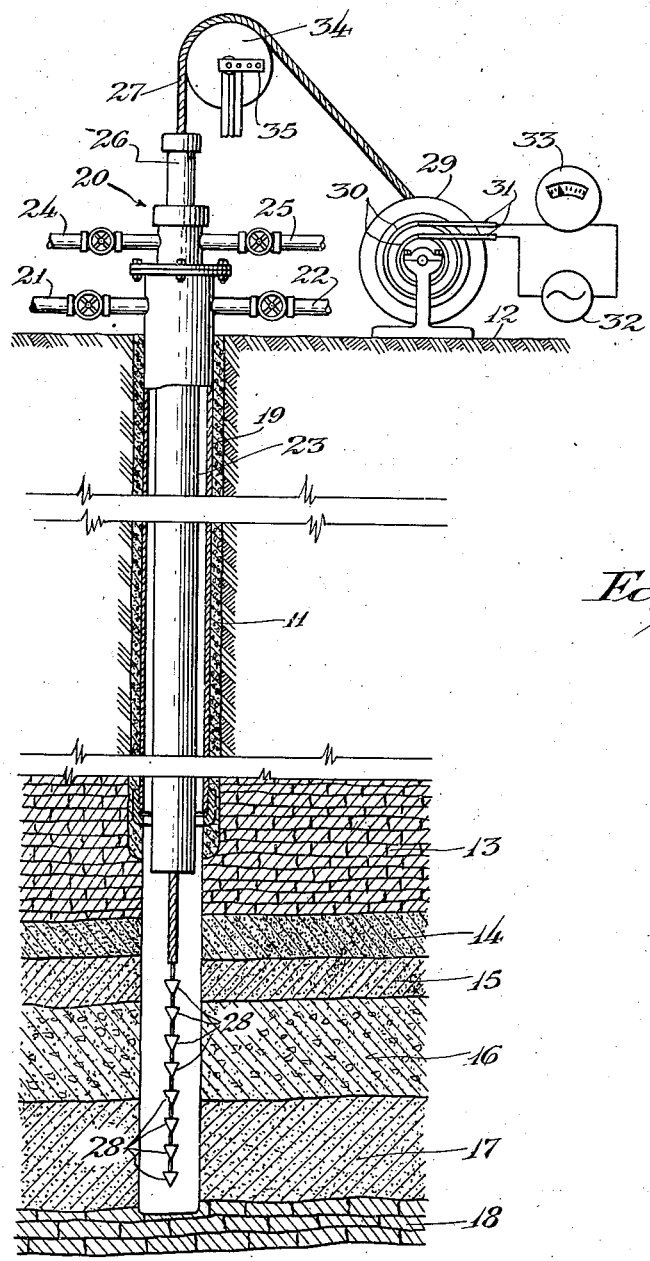
Figure 1 is a cross section of the crust of the earth showing an oil well which has penetrated a producing region with a diagrammatic representation of one type of apparatus useful in carrying out an embodiment of this invention.

Referring now to Figure 1, a well 11 has been drilled from the surface of the ground 12 through, among others, formations 13 to 18. Casing 19 has been set in the well and cemented in place. At the top of the well there is a casinghead indicated generally by numeral 20 with two valve controlled lines 21 and 22 connected with the annular space between the casing 19 and the tubing 23 and two other valve controlled lines 24 and 25 furnishing ingress to the tubing 23. It is assumed that it has been found that water is entering the well at some point in the uncased formations. The casinghead is provided with a lubricator 26, stuffing box or the like, through which the apparatus about to be described can be admitted to the well without substantial loss of fluids therefrom. This apparatus preferably consists of a two conductor insulated cable 27 at the lower end of which are connected a number of conductivity determining stations 28. The supply of cable is normally kept on reel 29 with the ends of the insulated conductors brought out to insulated slip rings 30 on the outside of the reel. Suitably insulated brushes 31 bear against these slip rings and are connected to a source of potential 32 and a meter 33 or other means of producing a visual indication of the current flow in the circuit. In order to indicate the depth of the conductivity determining stations 28 in the well, a measuring sheave 34 is provided adjacent the well head, the circumference of which is a known value, customarily 10 feet. The cable is reeved over this measuring sheave as it passes into the well and hence the number of revolutions on this sheave indicate the depth of the cable in the well. This depth can be read upon the revolution counter 35 attached to the axle of the measuring sheave.

If the well is a flowing well no further apparatus is necessary. However, if the liquid level in the well is below the top some form of lifting device such as a pump or gas lifting apparatus, must be employed. In this particular figure it is assumed that the well is flowing.

One outstanding advantage in the employment of the apparatus and method of this invention lies in the fact that each conductivity determining station includes a trap or collector whereby water droplets flowing by are collected and held. One simple design embodying this feature is shown in greater detail in Figure 2. In this embodiment the trap is in the form of a funnel-shaped metal member 38. A central metallic electrode 39 is firmly attached to member 38 by insulation 40. Preferably this insulation is rubber which is vulcanized to member 38 and electrode 39, but of course other means of attachment and other kinds of insulation can be employed. The dimension between the least interior diameter of the funnel and the outside diameter of electrode 39 is sufficiently great so that no single drop of water will bridge this gap. This spacing can, for example, be of the order of three-eighths to three-quarters of an inch or larger. Preferably this spacing is in the range of three-eighths to 2 inches. Small vents or openings 41 are provided in the upper conical portion of the member 38, the purpose of which will be described subsequently. It is desirable, although not entirely necessary, to provide a rubber guard ring 42 about the outside of the upper flared edge of member 38 in order to prevent the member 38 from striking the walls of the tubing or casing in the well. This is not an absolute requirement. From an inspection of the conductivity determining station it is apparent that drops of water falling through the oil in the well within the area defined by the top of the opening in member 38 will be collected or trapped in the bottom of this member so that as soon as a predetermined amount of water has been so collected and retained, it will form a conducting path between member 38 and electrode 39. The resistance between these two metal members will therefore decrease abruptly whenever this occurs and will remain at a low value until the collector is emptied. One superiority of this type of design lies in the fact that the water over a wide area in the well is collected and concentrated at one small region to give a positive indication which, once having been established, will not vary appreciably. The vents 41 in member 38 are provided so that if there is more water trapped or retained in any unit than that required to fill the collector to the lower level of the vent it will overflow and pass to the next conductivity determining station below.

Figure 2:
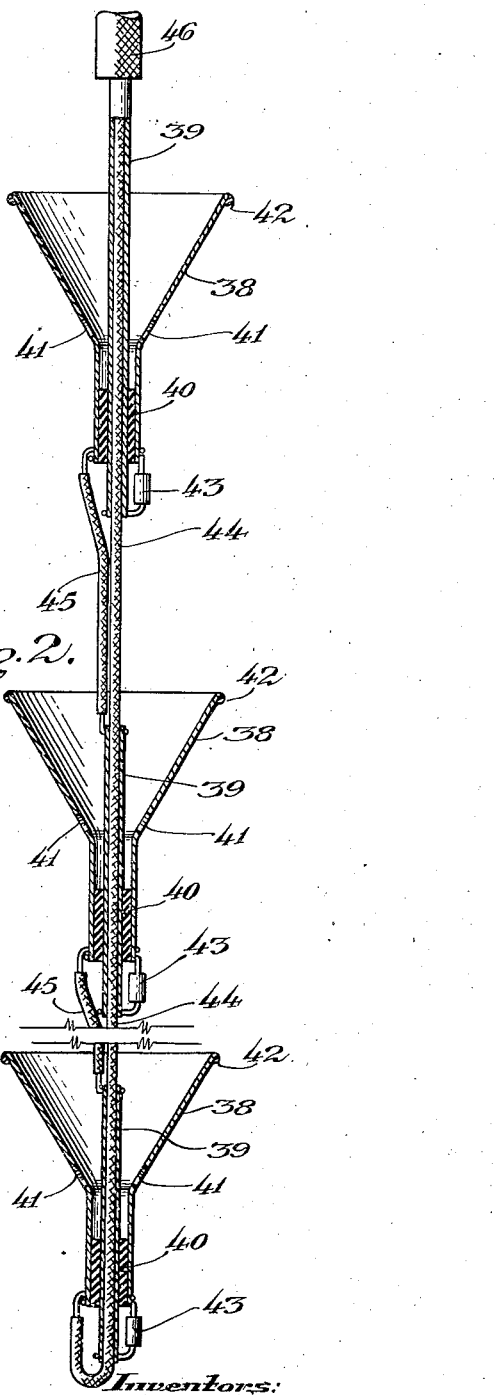
Figure 2 is a cross section of a portion of the conductivity determining apparatus shown in generalized form in the lower part of Figure 1.
Figure 3:
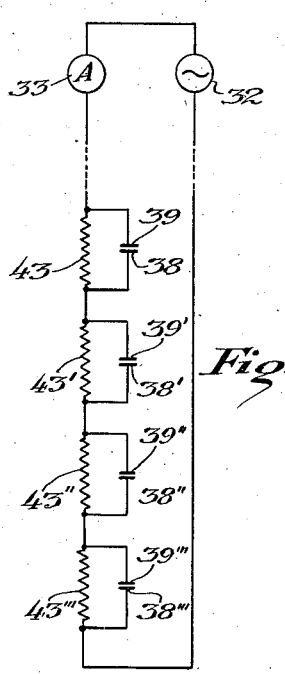
Figure 3 is an electrical circuit diagram representing in diagrammatic form the electric circuit of Figures 1 and 2.

There are many ways in which the change of conductivity across the electrodes occasioned by the trapping or retention of the water could be made to operate some sort of indicating device at the surface of the ground or, if desired, at a recording apparatus in the well itself. One circuit for use in this connection is illustrated in part by the equipment shown in Figure 2. A resistor 43 is connected between member 38 and electrode 39 at each conductivity determining station 28. The value of this resistor is chosen to be considerably greater than that across member 38 and electrode 39 when water has been trapped to short circuit the resistor, and is preferably lower than the resistance of the insulator 40. It is apparent that if desired a semi-conductor may be employed instead of insulator 40, so that there will be a relatively high resistance between member 38 and electrode 39, and whereby the need for the resistor 43 is eliminated. An insulated conductor 44 passes through the center of electrode 39 of each conductivity determining station and is connected electrically to the member 38 of the lowest of these stations. The electrode 39 of this station is connected through a second insulated conductor 45 to the member 38 of the next station above. The central electrode 39 of that station is similarly connected to the member 38 of the next higher station, and so on. The electrode 39 of the top station can, if desired, be made of a concentric metal sheath surrounding conductor 44, as shown in Figure 2. This conductor is in turn insulated by a sheath of insulating material 46 which may, if desired, be again surrounded by an armored sheath. From this description and from Figure 3 it is seen that there is a series circuit from the top electrode 39 through the first resistor 43, through the first member 38, through the electrode 39′ of the second station, through the second resistor 43′, through the corresponding member 38′ of this station, and so on, the circuit being completed through the insulated conductor 44. The two conductors are brought out through the cable to the surface of the ground where they are connected through the reel 29, slip rings 30 and brushes 31 to the current indicating device and source of potential 32. This is illustrated by the circuit diagram shown in Figure 3.

When water collects at any of the stations it short circuits the corresponding resistor, thus decreasing the total resistance in the series circuit and increasing the current through the current indicating device 33. This indicates to the operator the presence of the water. We prefer to use a different value for the resistance of each resistor 43 so that the change in current due to entrapment of water at any station will be uniquely related to the particular station in which it occurs. This can be accomplished, for example, by arranging the values of these resistances to be some multiple of the series 1, 2, 4, 8, 16 and so on. One such set of resistors which will operate satisfactorily has the values of 50, 100, 200, 400 and 800 ohms. It will be understood by those skilled in the art that the values chosen will depend upon the dimensions of the retaining zone of the collector and that this set of resistors is given only by way of example. However, other suitable values can also be used which do not fall in this series.

In practicing the invention in connection with the well shown in Figure 1, the conductivity determining stations are preferably lowered to the bottom of the well. Production in the well is stopped and an insulating liquid which can conveniently be oil is circulated through the well between tubing 23 and casing 19 at a sufficient rate to remove any standing water from the region to be investigated. This can be accomplished by the use of valved lines 21 and 24 or 22 and 25, etc. The source of potential 32 is then energized, causing a relatively small current to flow through the circuit and hence through the current indicating device 33. The well is then allowed to produce a small amount of fluid. If, as has been assumed, the well is of the flowing type, this is accomplished merely by the opening of the valve in line 24 or 25 which is sufficient to cause production to be resumed. Water from any of the permeable formations then enters the well, usually in the form of fine droplets and if the production is maintained at a relatively low rate, the drops of water gravitate downward and are trapped in the nearest conductivity determining station. As soon as enough water has been entrapped to short circuit the resistor 43, a change in current will be observed in the circuit and from the amount of this change in current the station at which the water was entrapped is determined. It is to be noted that this change is not merely a momentary effect which would be the result obtained if the water were allowed to pass on through the water entrapment station, but remains constant and fixed. Hence there is practically no opportunity to make an erroneous reading, as there would be if the indication were of a transitory nature. If water enters through two zones at the same time the corresponding current change will indicate the presence of water in both of these zones, and if the resistors 43 are of different values, as described above, the change in current will be a function of the particular stations at which the simultaneous entrapment occurred, hence there is little difficulty in determining these two stations. Finally, if the flow of water is sufficiently large or if the production is maintained for a sufficient length of time, water flows out of the ports 41 of the first station at which the entrapment occurs and bridges across the resistor 43 of the next station below, causing another current change and furnishing confirmatory evidence as to the location of the flow.

If the well is not a flowing well it is merely necesary to employ suitable means for causing the production of the water into the well after the well has been conditioned and while the cable is in the well. This can be carried out by methods and apparatus already known to the technologists in this art.

Figure 4:
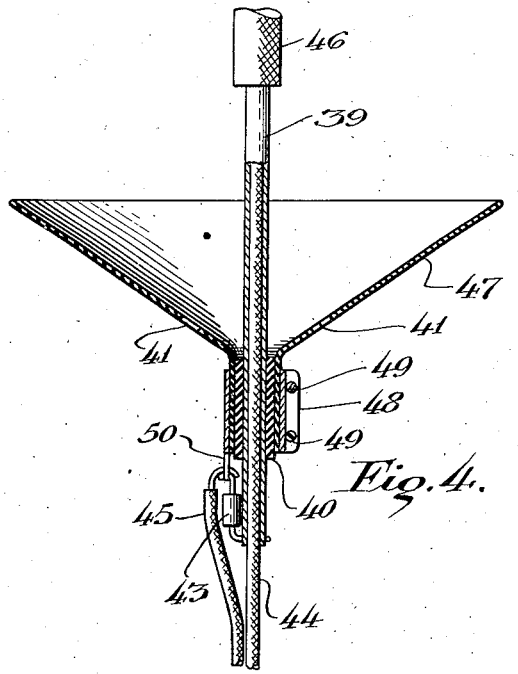
Figure 4 is a cross sectional view of another embodiment of our invention showing a different type of conductivity measuring apparatus.

If the flow of water is very small, it is possible that this flow will take place chiefly along the walls of the well and it will require considerable time for sufficient water to be entrapped at any station to produce an indication. In some cases no indication at all might be obtained. In order to reduce this possibility it is desirable in such cases to arrange for the opening in the member 38 to be as great as possible, preferably approaching the cross sectional area of the well. However, if the apparatus is to be lowered through a tubing such as shown in Figure 1, it is apparent that the use of a rigid member 38 precludes the use of such a member with an opening larger than the inside diameter of the tubing. In Figure 4 I have shown another type of conductivity determining station which gets around this difficulty. In this drawing the funnel-shaped member 47 is composed of a flexible conducting material. This may be, for example, conducting rubber of the type described in British Patent 494,058, the composition of which is given in the table:

Table I

| | Per cent |
|---|---|
| Rubber | 60.5 |
| Sulfur | 2.25 |
| Zinc oxide | 4.5 |
| Stearic acid | 2.0 |
| Paraffin wax | 2.0 |
| Antioxidant | 0.5 |
| Mercaptobenzothiazole | 0.75 |
| Acetylene black | 28.0 |

The maximum diameter of the funnel-shaped member 47 may be of any desired size and preferably should be chosen with regard to the diameter of the well in which measurements are being made so that it closely approximates this diameter, thus preventing substantial flow of water down the walls of the well, and hence causing it to collect in the center part of the trap.

In Figure 4 the flexible funnel-shaped member 47 is clamped by means of a split clamp 48 held together by screws 49 about the cylindrical insulation 40. This split clamp 48 is provided with an extension 50 to which the end of the conductor 45 and the resistor 43 can be attached. Since the rubber is conductive there will be an electrical connection between member 47 and the wires connected to the extension 50, in the same manner as that shown in Figure 2.

Since the funnel-shaped member is highly flexible it can be forced through a relatively small diameter tube and will open out into the form shown in Figure 4 after it has passed therethrough. When the conductivity determining stations are to be removed from the well the cone portion of member 47 is turned inside out by contact with the lower end of the tubing and hence can be easily removed through the tubing.

Oil-proof synthetic rubber is also manufactured with high electrical conductivity and it is contemplated that this material may be used instead of electrically conducting rubber such as that described above. Metal expansible electrodes can also be used. The particular design of the flexible equipment will vary according to the operator and the type of equipment in the well.

Figure 5:
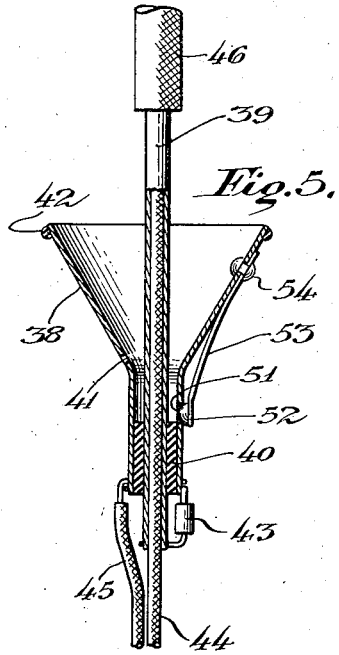
Figure 5 illustrates another embodiment of our invention showing a cross section of a conductivity determining apparatus suitable for lowering in the well, including a purging device.

Occasionally it is found that upon passage of the various conductivity determining stations into the well, water or other conducting material such as drill mud, etc., already present in the well is trapped and prematurely shorts out the corresponding resistor. Although this phenomenon is not a frequent occurrence, nevertheless difficulty of this type can be eliminated by arranging the collector or trap so that it can be purged of any water present prior to its use. We have shown in Figure 5 one very simple apparatus for accomplishing this result. In this case a port 51 has been provided in the funnel shaped member 38 at the point where the first water collects. This port is covered by a small, preferably hemispherical valve 52 carried on a flexible support 53 which is attached to member 38, for example by a rivet 54. The rest of the apparatus shown in Figure 5 is similar to that shown in Figure 2. The operation of this device is apparent from the drawing. After the stations have been lowered to a depth somewhat below their final position they are raised rapidly, thus forcing fluid downwardly and against valve 52. The port opening 41 is in this case preferably made quite small so that there will be a considerable pressure built up against the valve 52. The flexible support 53 thereupon bends, opening the port 51 and purging the trap of all water that has already settled in it. This procedure is preferably carried on after the well has been conditioned with the nonconducting liquid such as oil in order that no more water will flow into the traps until the formations are allowed to produce. Preferably the procedure is then repeated several times to insure that no water from an upper trap has settled into a lower trap without having been purged in turn. The main procedure outlined above is then carried out in order to determine the location of the water sands.

This particular type of check valve is, of course, only one example of many that might be illustrated. For example, the types of valves used in two-valve bottom hole samplers such, for example, as the type described in U. S. Patent 2,161,577 can be employed. We prefer to use a simple valve in order to permit maximum flexibility of the equipment.

Figure 6:
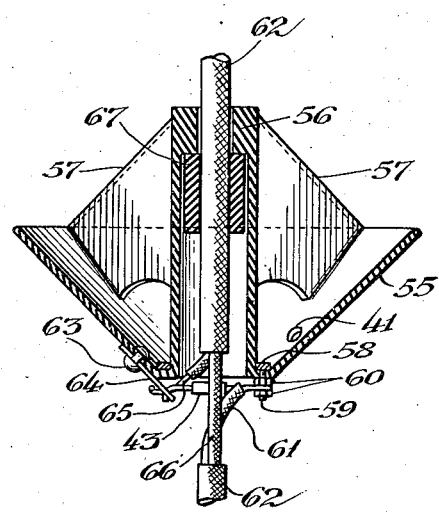
Figure 6 is a cross sectional view of another type of collector station useful in carrying out our invention.

Although the previous figures have shown water detecting apparatus in which the outer electrode at each station was flared to form the water collector, it is, of course, not necessary that such arrangements be used. For example, in Figure 6, is shown a fluid collection station in which the collector is of insulating material. This collector 55 may be constructed, for example, of plastic such as Bakelite or the like. As shown, it is provided with a central portion 56 from which radiate guides 57 connecting the top of the central portion 56 with the rim of the collector 55. These guides do not extend to the bottom of the collector. In the bottom of the collector a metallic ring electrode 58 is placed. It is furnished with a screw threaded extension 59 to which by means of nuts 60 one insulated conductor 61 of a two-conductor cable 62 is attached. One terminal of the resistor 43 is also connected to the extension 59. A rivet 63, spaced a predetermined distance from the ring electrode 58 forms the other electrode. To it is fastened an extension lug 64. Attached to this lug is the other terminal of resistor 43 and the conductor 65 which, before attachment, was the continuation of the conductor 61. The second conductor 66 in the cable 62 is continuous and unbroken down to the lowest collector station where it is attached in the same manner as the central conductor 44 of the previous figures was attached. One or more ports 41 are provided for overflow purposes, as before. The cable 62 is provided with a clamp 67 which may be either a split metal clamp held in place by screws or a cylindrical section of rubber vulcanized to cable 62, in order to support the collector 55 and keep it in place. It is apparent from this description that the operation of this equipment is precisely the same as that shown, for example, in Figure 2, and that when sufficient water has collected in the bottom of the collector 55 to short circuit between electrodes 58 and rivet 63 that there is a change of resistance in the series circuit which is communicated to the surface by means of cable 62 and detected in the manner already described. If desired, the collectors can be formed of metal and the electrodes 58 and 63 insulated therefrom. The guides 57 form a particularly useful purpose in that when the stations are pulled up into tubing such as shown in Figure 1, the guides automatically center the station as it is pulled into the end of the tubing so that there will be no danger of chipping or breaking the edge of the collector. If desired, similar guides could be used with the type of collector station shown in Figures 2 and 5.

Although the description of the conductivity determining stations has been directed to types with a conical inlet, various other configurations can be used. It will also be apparent to those skilled in the art that other types of electrical circuits can be employed for the indication of the short circuiting action of the entrapped liquid.

While our invention has been described with particular reference to certain theories of operation we do not mean to be restricted thereby, nor is there any election on our part to be restricted to the particular equipment shown and described. This invention is best defined by the scope of the appended claims.

We claim:

1. A method of determining the location of a zone of water ingress into an oil or gas well comprising conditioning said well to remove water from the producing section thereof, preventing the ingress of fluids from well formations into said well during said conditioning, thereafter causing ingress of fluids from said well formations by producing said well, entrapping for an appreciable period of time a substantial portion of water being produced in each of a plurality of adjacent vertically disposed zones in said well at stationary points disposed at the lower boundary of each of said zones and effecting a change in an electrical characteristic at the surface of the well by the entrapment of a plurality of drops of water at any one of said points.

2. A method of locating the regions of salt water ingress into an oil or gas well including establishing within the uncased portion of said well a plurality of vertically separated water stratifying zones, stopping the flow of fluids into the well from said uncased portion thereof, displacing any water in said uncased portion of said well by oil, thereafter causing water from said uncased portion of said well to flow into said well, entrapping for an appreciable period of time a substantial portion of said water at said water stratifying zones adjacent said regions of water ingress, and producing at the surface of the ground a change in a single composite electrical condition due to the stratification of a predetermined volume of entrapped water at any of said water stratifying zones.

3. A method of locating the regions of salt water ingress into an oil or gas well including disposing in the uncased portion of said well a plurality of vertically separated water collectors, stopping the flow of fluids into the well from said uncased portion thereof, removing water from said uncased portion of said well, thereafter causing water from said uncased portion of said well to flow into said well, entrapping for an appreciable period of time a substantial portion of said water at said water collectors adjacent said regions of water ingress while maintaining said collectors stationary relative to said uncased portion of said well and while producing fluids from said well, producing an electrical effect at each of said water collectors the magnitude of which changes by a predetermined amount upon the entrapment at said collectors of more than a predetermined volume of water, and producing at the surface of the ground a single resultant of the magnitude of said electrical effects at all of said water collectors.

4. A method according to claim 3 in which said change in the magnitude of said electrical effect is different at each of said collectors, whereby the change in the magnitude of said resultant of said electrical effects is uniquely related to those of said collectors at which more than said predetermined volume of water is entrapped.

5. In apparatus for determining the location of the zones of water ingress into an oil or gas well, an electrically conducting collector adapted to be lowered into a well, said collector being so shaped and constructed that any water entering said collector is collected in a relatively small region within said collector, an electrode placed in said region but separated from said collector by such a distance that at least several drops of water are required to connect said electrode and said collector, an electrical resistor connecting said electrode and said collector, and a series electrical circuit including a source of potential and means for producing a visual indication of the current flowing in said series circuit, said electrode, said collector and said resistor.

6. In apparatus for determining the location of the zones of water ingress into an oil or gas well, a plurality of sets of two electrodes, said two electrodes in each of said sets being spaced apart a minimum distance greater than the maximum dimension of a drop of water, a plurality of insulators one of which separates each of said sets of said electrodes, each of said insulators and at least one of each of said sets of electrodes being constructed and adapted to define a water trapping collector whereby drops of water entering said collector are retained in the region adjacent the minimum spacing between said two electrodes, a plurality of resistors, each one of which is connected between the electrodes of one of said sets of two electrodes, and an electrical circuit including means for producing a visual indication of the current flowing in said circuit, said circuit extending to the surface of the earth and associated with said sets of electrodes whereby the short-circuiting of any of said resistors by the trapping of a predetermined quantity of water in any of said collectors produces an indication in said current indicating means.

7. Apparatus according to claim 6 including purging means associated with said electrodes adapted to remove conducting fluids from said collectors.

8. In apparatus for determining the location of the zones of water ingress into an oil or gas well, a plurality of sets of two electrodes, said two electrodes in each of said sets being spaced apart a distance not less than three-eighths nor more than two inches, a plurality of insulators each of which is adapted to separate the said two electrodes of one of said sets of electrodes, one of said electrodes in each of said sets being flared and adapted to form with said insulator and the other electrode of said set a means to collect water in the fluid of said well in a pool adjacent said electrodes, a plurality of resistors, one for each of said sets of electrodes and connected between the electrodes in said set, and a single electrical series circuit including a source of potential, a current indicating device, said plurality of resistors and insulated conductors between the surface of the earth and said sets of electrodes.

9. In apparatus for determining the location of a zone of water ingress into an oil or gas well, a plurality of sets of two electrodes, said two electrodes in each of said sets being spaced apart, one electrode of each set being constructed of a flexible conducting material and in part conically shaped, and adapted to form with said insulator and the other electrode of said set a means to collect droplets of water in said well in a pool adjacent said electrodes, a plurality of resistors, one to each of said sets of electrodes and connected between the electrodes in said set, a single electrical circuit connected to said electrodes and including two insulated conductors in a cable extending to the surface of the earth and means at the surface for determining changes in the impedance of said circuit due to entrapment of water in said conically shaped flexible electrode, means for lowering said cable in said well, and means for determining the location of said sets of electrodes in said well.

10. Apparatus for determining the location of a zone of water ingress into an oil or gas well including means for removing water from the producing section of said well, means for controlling the flow of fluids from permeable formations of said producing section into said well, a cable including two insulated conductors, means for lowering said cable in said well, means for determining the length of said cable in said well, a plurality of substantially vertically spaced pairs of electrodes attached to said cable, one of each pair of electrodes being constructed with an enlarged conical section, a plurality of insulators, one for each pair of electrodes, adapted to space said electrodes a distance greater than the greatest dimension of a drop of water, and to define with said electrodes a water collector whereby drops of water are trapped in a region adjacent the minimum spacing of said electrodes, means for removing conducting fluids from each of said water collectors, a number of resistors equal to the number of pairs of electrodes, each resistor having a different ohmic value than that of any other resistor, each of said resistors being connected across one of said pairs of electrodes, means for connecting all of said resistors in series to the two conductors in said cable, and means at the surface of the ground connected to said two conductors of said cable for detecting the change in resistance of the circuit including said cable, said resistors, and said electrodes.

11. Apparatus according to claim 10 in which the ohmic value of said resistors are integral multiples of members of the series 1, 2, 4, 8, 16, 32.

12. A method of locating a zone of ingress of conducting fluid to a well producing both conducting and nonconducting fluids comprising the steps of conditioning said well to remove conducting liquid therefrom, thereafter permitting fluids to enter said well, entrapping for an appreciable period of time a portion of said fluids within at least one constricted zone, accumulating conducting fluids in a lower portion of said zone and producing a change in a signal when the amount of said accumulated conducting fluid exceeds a predetermined minimum quantity.

13. A method of determining the location of a zone of water ingress within an oil or gas well comprising conditioning said well to remove water therefrom, preventing the ingress of fluids from well formations into said well during said conditioning, thereafter permitting ingress of fluids from said well formations into said well, entrapping a portion of the fluids entering the well at at least one stationary point adjacent the location of a zone of water ingress, separating the water from the entrapped well fluids to produce a bottom water layer and producing a signal when the quantity of entrapped water so separated exceeds a predetermined minimum quantity.

14. An apparatus for determining the location of the zones of water ingress of an oil or gas well, means for entrapping water for an appreciable period of time and for stratifying a bottom water layer, said means being adapted to be lowered into the fluid in said well and to cause water in the fluid thereabove to be entrapped within a zone of relatively small cross-sectional area as compared to the cross-sectional area of the well, and means for producing a change in an electrical effect of a predetermined magnitude upon the entrapment and segregation of water within said entrapping and stratifying means.

15. An apparatus for determining the location of zones of water ingress of an oil or gas well, water entrapping means adapted to be lowered into said well and to accumulate entrapped water in a constricted portion thereof for an appreciable period of time, two separated electrodes within said constricted portion of said entrapping means, a conducting path between said electrodes being provided by the entrapment of a predetermined quantity of water within said constricted portion, and means actuated by the electrical connection of said electrodes by the entrapped water to produce a unidirectional change in an electrical current through a circuit.

16. An apparatus for determining the location of zones of water ingress to an oil or gas well, an electrically conducting entrapping means adapted to be lowered into said well and to permit any water entering said entrapping means to be retained for an appreciable period of time within a constricted portion of said entrapping means, at least one electrode spaced from said entrapping means and located in said constricted portion thereof, and an electrical means including said entrapping means and said electrode adapted to cause a change in current in a circuit, one portion of which is located at the surface of the earth, when sufficient water is retained within said entrapment means to form a conducting path between said entrapping means and said electrode.

17. The method of locating a zone of ingress of conducting fluid to a well producing both conducting and nonconducting fluids, the steps of introducing a conditioning fluid to said well to remove conducting fluids, displacing the conditioning fluid by introducing well fluids, segregating a portion of incoming well fluid in at least one zone which is shielded on the sides and bottom from the incoming well fluid, separating conducting fluid from said segregated portion within said zone, collecting a pool of conducting fluid in a lower portion of said zone, and utilizing the collected conducting fluid for producing a signal when the pool of said collected conducting fluid exceeds a predetermined minimum depth.

18. Apparatus for locating a zone of ingress of conducting fluid in a well producing non-conducting fluid including means for temporarily excluding conducting fluid from the region in said well under investigation, a plurality of receptacle means, means for supporting said receptacle means in a spaced substantially vertical array within the said region under investigation, means for producing said well, and means within each of said receptacle means for determining a change in an electrical property of fluid accumulated within said receptacle means by stratification of conducting fluid accumulated therein while producing the well.

19. The method of locating a zone of ingress of conducting fluid to a well producing both conducting and non-conducting fluids comprising the steps of introducing a conditioning fluid to said well to remove conducting fluids, displacing the conditioning fluid by well fluids, segregating portions of incoming well fluid at a plurality of vertically disposed zones, each shielded on the sides and bottom from the incoming well fluid, separating conducting fluid from said segregated portion within at least one of said zones, collecting a pool of conducting fluid in the bottom portion of said last-mentioned zone, and utilizing as an indication of the zone of ingress of conducting fluid a signal produced in response to a predetermined depth of the pool of conducting fluid separated in said last-mentioned zone.

RILEY FLOYD FARRIS.
JOSEPH B. CLARK.